United States Patent Office 3,484,851
Patented Dec. 16, 1969

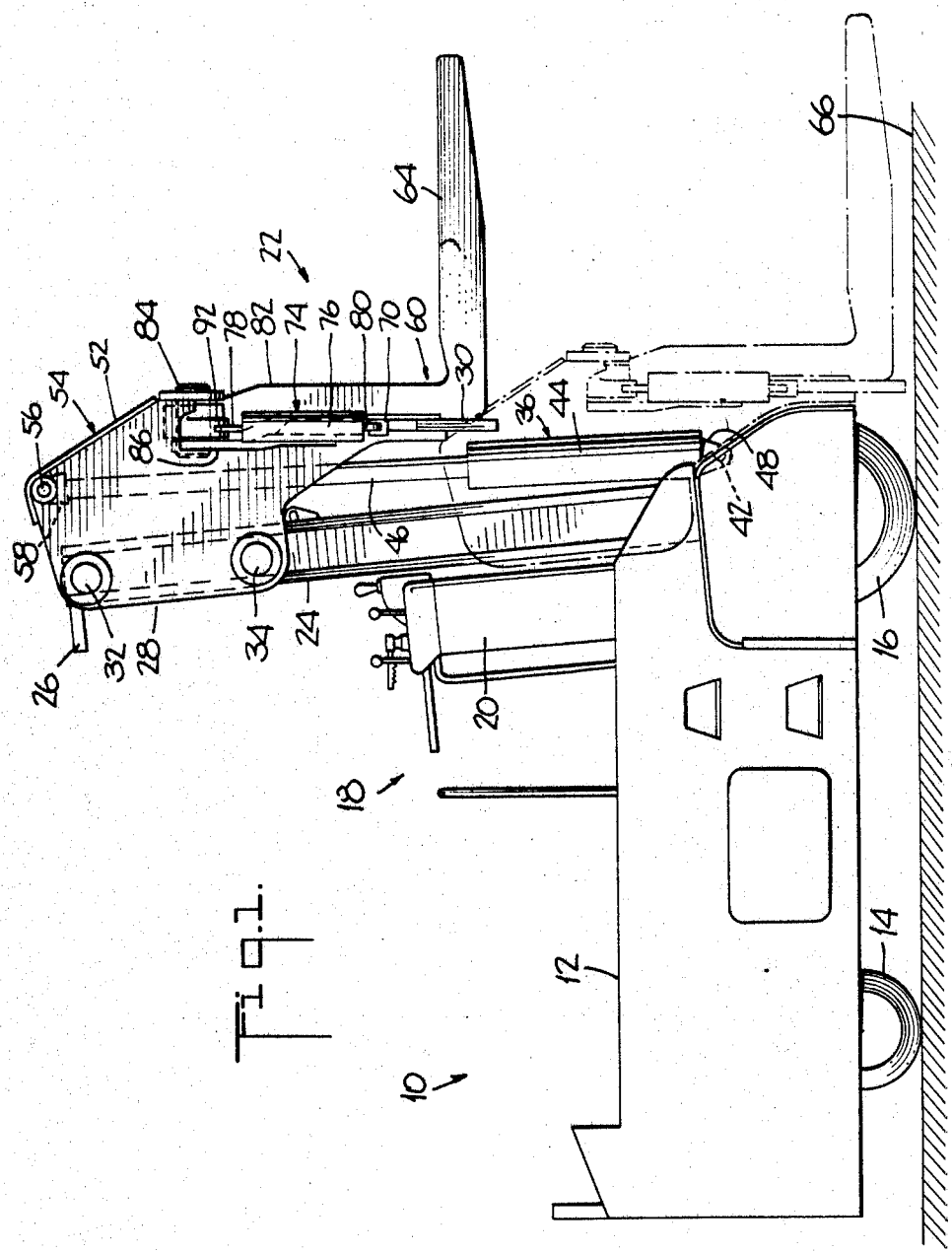

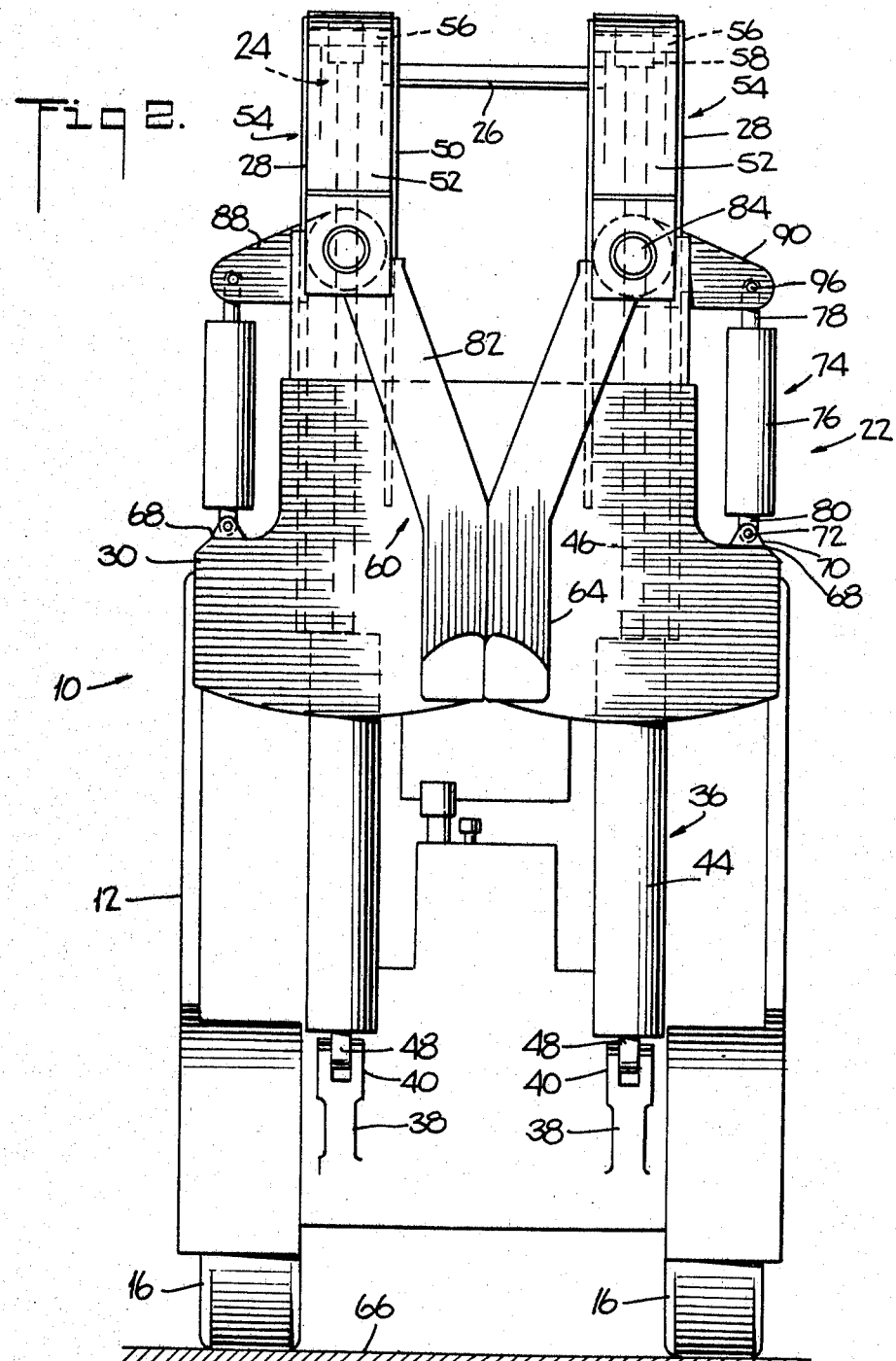

3,484,851
INDUSTRIAL LIFT TRUCK
Henry J. Houseman and Ernst S. Esser, Levittown, Pa., assignors to Eaton Yale & Towne Inc., Cleveland, Ohio, a corporation of Ohio
Filed Aug. 16, 1967, Ser. No. 661,026
Int. Cl. B66f 9/12
U.S. Cl. 214—731                                    2 Claims

ABSTRACT OF THE DISCLOSURE

Industrial lift truck wherein the load-carrying member is closely related to the front traction wheels, but mounting the lift rams forwardly of the primary uprights, while retaining the primary uprights so that they are in substantial vertical alignment at their lower ends with a vertical line passing through the axis of rotation of the front traction wheels.

---

This invention relates to industrial lift trucks of the type adapted to lift extremely heavy loads by movement of a load-carrying member on vertical uprights.

THE PROBLEM

In vehicles of this particular class, it is important to keep the overall length of the truck to a minimum, including the load-lifting member which extends forwardly of the front of the truck. At the same time it is extremely important to mount the movable load-carrying member of the truck so that is is closely related to the forward wheels, which are generally the traction wheels.

In trucks of this class, the load-carrying member is part of a carriage which is mounted on rollers for vertical movement on a pair of uprights. In the past, it has been one common practice to position the uprights substantially rearwardly of the front traction wheels in order to maintain a close relationship between the load-carrying member and the forward traction wheels. This is shown in the Ulinski Patent No. 2,545,417.

It has also been a common practice in the past to position the load-lifting rams for operating the load-carrying member and its carriage behind the uprights. This is shown in the Schroeder Patent 2,676,723 dated Apr. 27, 1954, to which reference is made. This arrangement, of course, is a position substantially rearwardly of the front driving wheels and the weight further throws the balance of the truck toward the rear.

Obviously both of the aforementioned arrangements require a lengthening of the truck chassis because the controls and rear wheels must be placed well rearwardly of the uprights for proper balance of the vehicle when a load is being carried by the load-carrying member—particularly when the load is in an elevated position, which tends to unsettle the equilibrium of the truck by raising the center of gravity so that tipping and steering factors become greatly magnified.

Also, it will be noted that both the Ulinski and Schroeder patents locate the rams for lifting the load carriage at the longitudinal center of the truck, between the uprights. At this position, the rams present a very serious obstacle to good vision for the truck operator.

From the foregoing it will be evident that an improved lift truck embodying uprights in substantially vertical alignment at their lower ends with a vertical line running through the axis of rotation of the front traction wheels—and further wherein the lift rams for the load-carrying member and its carriage—are positioned in front of the uprights, would provide a substantial advance to the art.

It is further evident that a substantial improvement to the art would be provided by a lift truck wherein the lift rams are positioned off to the side of the longitudinal center line of the truck and therefore away from a position between the uprights.

Accordingly, objects of our invention are to improve the art of industrial lift trucks of the type adapted to lift extremely heavy loads by movement of a load-carrying member on vertical uprights.

Our invention provides a substantial contribution to the operation of industrial lift trucks by providing an improved lifting mechanism including uprights, carriage and load-carrying members wherein the lift rams are positioned in front of the uprights and outboard of the longitudinal center line of the truck, and further while retaining the uprights so that they are in substantial vertical alignment at their lower ends with a vertical center line passing through the axis of rotation of the traction wheels.

Thus, both improvements in utility and in economy of manufacture are enhanced by the present invention and further, the durability of the entire mechanism is greatly improved.

It is a feature of our invention that each of the two lifting rams is mounted forwardly of an upright so as not to lie in the path of vision of the operator of the truck. As a particular feature of this portion of the invention, each ram is so mounted forwardly of its upright that its lower end is just above the peripheries of the wheels, and juxtaposed to the particular upright in front of which it has been positioned. As a further particular feature of the invention, since each upright is tilted backwardly, each ram is positioned to occupy a substantially vertical position with its thrust reacting between the load and the upright in substantially the same effective manner as in the Ulinski patent, where the rams are in substantial vertical alignment with the uprights.

As a further feature of the invention, the load carriage, through which the load is moved relative to the uprights by the thrust of the rams, is formed with upwardly extending portions to which the upper ends of each ram are secured, each carriage then extending downwardly to a position to lie just forwardly of the traction wheels so as to bring to a minimum the overhang of the load relative to the wheels.

We have thus outlined the general nature of our invention and its relationship to the prior art in order that the description thereof that follows may be better understood, and in order that our contributions to the art may be better appreciated. There are, of course, additional features of our invention that will be described hereinafter and which will form the subject matter of the claims appended hereto. Those skilled in the art will appreciate that the conception upon which our disclosure is based may be readily utilized as the basis for designing other structures for carrying out the several purposes of the invention. It is important therefore that the claims granted to us shall be construed sufficiently broadly to prevent the appropriation of our invention by others skilled in the art.

Referring now to the drawings:

FIGURE 1 is a vertical, side elevational view, showing schematically the arrangement of a fork lift truck of the very heavy duty industrial type, embodying the features and principles of the present invention; and FIGURE 2 is a front elevational view taken along the line 2—2 of FIGURE 1.

Referring now more particularly to the drawings, the heavy duty industrial lift truck of the class herein described is designated by the reference numeral 10. This truck 10 comprises a main frame or body 12 having a rear wheel 14 at the central rear portion. Traction wheels 16 are located beneath the extreme front end portion of the frame 12. This truck 10 may be powered and steered through any suitable means for the purpose, and the particular details of these means are not important to an understanding of our invention. Suffice it is to say that a suitable power plant is located within the rear portion of the body 12.

At the operator position 18 there is provided a control panel 20 where various controls for manipulating the truck 10 are located. These include controls for steering, raising and lowering the load lifting carriage 22, etc.

As is customary in lift trucks of this class, the front end of the frame 12 is equipped with a pair of spaced uprights 24, bridged by an upper transverse beam 26, FIGURE 2, for rigidity. The lower ends of the uprights 24 are secured to the frame 12 of the truck 10 in a suitable manner. The load-lifting carriage 22 is mounted on the uprights 24 for vertical movement. In the particular embodiment shown, the uprights 24 are of I-beam cross sectional shape and are substantially vertically oriented, but are cocked to the rear by a few degrees from true vertical so that the center of gravity of the load carried by the load carriage 22 will be shifted inwardly toward the truck 10 as the load carriage moves upwardly. This factor improves the stability of the truck 10 when the load is in an elevated position.

It is to be noted that the uprights 24 are in substantialy vertical alignment at their lower ends with a vertical line running through the axis of rotation of the front traction wheels 16. This is a first important feature of the invention. Further, note that the lower ends of the uprights 24 are positioned just above the peripheries of the traction wheels 16.

The load carriage 22 includes a heavy plate member 28 on each side. The side plate members 28 are bridged by a front transverse plate 30, FIGURE 2. Each of the side plates 28 of the load carriage 22 is provided with upper and lower carriage roller assemblies 32 and 34 which mate with the channels of the uprights 24 and thereby facilitate vertical movement of the load carriage 22.

By this arrangement the rollers 32 and 34 guide the load lifting carriage 22 as it moves along the uprights 24. As shown in FIGURE 2, when the load carriage 22 is in its lowermost position, the front plate 30 will occupy a position in front of the traction wheels 16.

THE LOAD LIFTING RAMS

As a means for lifting the load carriage 22, load lifting rams 36 are employed. The manner in which these rams 36 are positioned in front of the uprights 24 is best shown in FIGURE 1. The manner in which the load lifting rams 36 are positioned out of alignment with the longitudinal center line of the truck 10 is best shown in FIGURE 2.

As has been mentioned, the forward mounting of the lift rams 36 is an important feature of this invention. By this means an excellent leverage factor is provided for moving the load lifting carriage 22 up while supporting a load. This is accomplished while retaining the uprights 24 so that they are in substantial vertical alignment at their lower ends with the vertical line passing through the axis of rotation of the front traction wheels 16.

Now by reference to FIGURE 2, it will be noted that a yoke 38 is secured to the frame 12 at a position adjacent to each of the front traction wheels 16. It will be noted that each of these yokes 38 is directly in front of an upright 24. At the upper end, each yoke 38 has a transverse eye or opening extending through the two spaced arms 40. By reference to FIGURE 1, it will be noted that a pivot pin 42 is thereby mounted in the eye of each yoke 38. The hydraulic lift rams 36 each include a cylinder 44 and a piston rod 46, for lifting the load carriage 22. At the lower cylinder head end of each cylinder 44, a pivot lug 48 is provided which has a transverse hole to receive the pivot pin 42. This completes a pivotal connection at the bottom between the frame 12 of the truck 10 and the cylinder 44 of each lift ram 36.

The upper, terminal end of each piston rod 46 of each lift ram 36 is pivotally connected to the load carriage 22. As shown in FIGURE 2, inner plates 50 are provided in the upper area of the roller assemblies 32 and 34 on the load carriage 22. Front upper plates 52 complete spaced upper box-like structures 54. In the top of each of the box structures 54, there is provided a pivot pin 56 which extends between the side plate 28 and the inner plate 50, through appropriate holes in the plates.

At the upper terminal end, each piston rod 46 is provided with a pivot lug 58 which has a transverse hole to receive one of the pivot pins 56.

By this arrangement, the upper end of the piston rod 46 of each lift ram 36 is pivotally mounted to the load carriage 22.

This describes the important mounting of the load lift rams 36 forwardly of the uprights 24. It will be noted that this arrangement is effective to position the lifting apparatus, including the uprights 24 and the load carriage 22, forwardly, either above or in front of the front traction wheels 16 of the truck 10. This permits shortening of the wheelbase of the truck 10 while safely retaining stability for balancing heavy loads. Note that the uprights 24 extend slightly rearwardly and that the orientation of the load lift rams 36 is also just a degree or so off true vertical. Thus, the load is thrown on the traction wheels 16, but the power plant and weight of the truck at the rear of the frame 12 provides an ideal counterbalancing weight ratio.

As has also been mentioned, the mounting of the lift rams 36 off to the side of the longitudinal center line of the truck 10 and therefore away from a position between the uprights 24 provides a further important feature of the invention. By reference to FIGURE 1, it will be noted that the lift rams 36 are located directly in front of the uprights 24, and by reference to FIGURE 2, it will be noted that the lift rams 36 are displaced laterally from the longitudinal center line of the truck 10. This makes the entire area between the uprights 24 available to the driver for forward vision. Also, this space is still available except for the area occupied by the front plate 30, even when the load carriage 22 is in its extreme elevated position as shown in FIGURE 2.

The load-engaging member of our invention is designated generally by the numeral 60 and extends horizontally forward from a lower portion of the load carriage 22 in the manner of a conventional ram.

Our load-engaging member 60, howeveer, is longitudinally split so as to provide two complementary sections that can be laterally separated so as to provide a pair of horizontally disposed tines 64. These are adapted to be inserted into a coil of steel, or spread to be inserted into the lower portion of a load pallet or the like.

By this arrangement, the horizontal tines 64 of the load carriage 22 can be brought down to floor level 66 for the purpose of picking up and lifting a load. Thus, the load can be picked up and the movable main frame 12 provides for lateral movement of the load relative to the floor 66 between one storage area and another.

In order to afford lateral movement of the horizontal tines 64 and to support these tines most effectively from the load carriage 22, the following construction is used. The main body portion of the load lifting carriage 22 includes the transverse front plate 30 as previously mentioned.

At each side, the front plate 30 of the load carriage 22 includes a step 68 to which is mounted a pivot yoke 70. These pivot yokes 70 are similar in construction to the yokes 38 supporting the lower cylinder head ends of the lift rams 36. A pivot pin 72 is mounted in each yoke 38. The tine rams 74 each includes a cylinder 76 and a piston rod 78. The cylinder head end of each tine ram 74 includes a pivot lug 80 which receives the pivot pin 72 in a transverse hole and is embraced by the spaced arms of the pivot yoke 70.

Each of the horizontal load engaging tines 64 is part of a L-shaped arm section, having an upright upper arm portion 82 which is pivoted at its upper shoulder end to one of the previously described box section units 54. Pivot pins 84 are provided in each of the box sections 54 between the front plates 52 and spaced rear plates 86, shown in FIGURE 1.

As shown in FIGURE 2, lever members 88 and 90 extend out left and right respectively from the upper shoulder ends of each of the upper arm portions 82. As shown in FIGURE 1, each lever member 88 and 90, includes a pivot yoke 92 at the outer end. The upper terminal end of each piston rod 78 of each tine ram 74 is provided with a transverse hole to receive a pivot pin 96, which also passes through the spaced arms of the pivot yokes 92 located at the outer ends of each lever member 88 and 90. It will be evident from the foregoing that extension and retraction of the piston rods 78 of the tine rams 74 will be effective to move the horizontal tines 64 of the load carriage 22 in a lateral manner.

It will be noted that the tine rams 74 are outboard of the lift rams 36 and are also outboard of the uprights 24. Thus, an unobstructed view between the uprights 24 is provided for the operator of the truck 10.

As will be evident from the foregoing description, a substantial contribution to the art of heavy duty lift trucks is provided. Unobstructed vision for the operator and improved weight balance are provided. Further, it will be evident that the truck 10 is very compact as concerns lateral width while "hiding" the rams 36 that lift the load carriage 22, and also the tine rams 74 which operate the horizontal load-engaging tines 64, forming a part of the load carriage 22.

We claim:

1. A heavy duty industrial truck comprising a main frame, drive wheels mounted at the forward end of said main frame, a pair of uprights secured on said main frame and inclined away from a vertical line passing through the center of rotation of said wheels with the inclination away from said forward end, the lower end of said uprights being substantially in alignment with said vertical line passing through the center of rotation of said wheels, a load carriage comprising a pair of main plates extending longitudinally of the truck and connected together by a front vertical plate, said main plates carrying upper and lower rollers and mounted through said rollers for vertical movement on said uprights, a pair of rams mounted respectively on said main frame adjacent one of said uprights, support means on said main frame mounting the lower end of each ram so that each ram is vertically positioned substantially in line longitudinally with and forwardly of said uprights and juxtaposed at its lower end to one of said uprights and just above the upper periphery of one of said wheels, each of said main plates having a portion extending forwardly from said upper rollers and then downwardly to form a load carrying member with said vertical plate in juxtaposed relation to the forward periphery of said wheels, load lifting tines pivoted to said load carriage vertically between said upper and lower rollers and means securing the upper end of each of said rams to the forwardly extending portions of said main plates and above said rollers and the pivots of said tines with each ram in susbtantially vertical position between an upright and said vertical plates to impart lift to said load carriage.

2. A truck as defined in claim 1, wherein each load lifting tine is pivoted by second ram means extending from said front plate to said tine means for actuating the same, said second ram means being located outboard of said uprights.

References Cited

UNITED STATES PATENTS

| | | | |
|---|---|---|---|
| 2,581,791 | 1/1952 | Gilman | 187—9 |
| 2,653,678 | 9/1953 | Lehrman | 187—9 |
| 2,676,723 | 4/1954 | Schroeder | 214—653 |
| 3,127,956 | 4/1964 | Hosbein | 187—9 |

HARVEY C. HORNSBY, Primary Examiner

U.S. Cl. X.R.

187—10; 214—653